(12) United States Patent
Grillo et al.

(10) Patent No.: US 6,232,916 B1
(45) Date of Patent: May 15, 2001

(54) GPS RESTRAINT SYSTEM AND METHOD FOR CONFINING A SUBJECT WITHIN A DEFINED AREA

(75) Inventors: Anthony Grillo, Wayne; John P. Veschi, Fogelsville, both of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/387,180

(22) Filed: Aug. 31, 1999

(51) Int. Cl.$^7$ .................................................. H09B 7/185
(52) U.S. Cl. .................. 342/357.07; 340/573.3; 340/573.4; 119/721; 119/908
(58) Field of Search .................. 342/357.07, 357.08, 342/357.13, 357.17; 340/573.3, 573.4, 10.51, 539; 119/721, 908

(56) References Cited

U.S. PATENT DOCUMENTS

| | | | |
|---|---|---|---|
| 5,416,468 | 5/1995 | Baumann | 340/573 |
| 5,568,119 | 10/1996 | Schipper et al. | 340/825.37 |
| 5,748,148 | 5/1998 | Heiser et al. | 342/457 |
| 5,781,113 | * 7/1998 | Yarnell, Sr. et al. | 340/573.3 |
| 5,793,882 | 8/1998 | Piatek et al. | 382/115 |
| 5,868,100 | * 2/1999 | Marsh | 119/721 |
| 6,043,748 | * 3/2000 | Touchton et al. | 340/573.3 |

* cited by examiner

Primary Examiner—Thomas H. Tarcza
Assistant Examiner—Fred H. Mull

(74) Attorney, Agent, or Firm—Brown & Michaels, P.C.

(57) ABSTRACT

A Global Positioning Satellite ("GPS")-based restraint system includes a GPS receiver/transmitter for receiving GPS timing signals, a mapping algorithm, a comparator, and a base station receiver. The receiver/transmitter includes a microprocessor for calculating and storing a waypoint. The mapping algorithm calculates a mapped programmed confinement area from a plurality of waypoints obtained along the perimeter of the physical confinement area, and the comparator provides an output comparing the present position of the receiver/transmitter with the programmed confinement area. The comparator output is transmitted as an output signal by the receiver/transmitter to the base station receiver and the position of the subject is monitored while the receiver/transmitter is attached to the subject. The restraint system also includes deterrent means for administering a deterrent to the subject that can be used either in lieu of or with the base station receiver. The deterrent means is attached to the subject and is preferably part of the GPS receiver/transmitter. The comparator output is then selectively input to the deterrent means to administer the deterrent to the subject. The GPS restraint system of the invention is readily transportable and can be remapped in a new location or to reconfigure an existing confinement area. Reinstallation costs associated with wire perimeter systems are eliminated by the present invention. The GPS-based restraint system is not subject to the blackout areas of other systems, and it provides accurate and reliable confinement boundaries for restraining a subject within the selected confinement area.

27 Claims, 2 Drawing Sheets

GPS RESTRAINT SYSTEM AND METHOD FOR CONFINING A SUBJECT WITHIN A DEFINED AREA

FIELD OF THE INVENTION

The invention pertains to the field of positional monitoring systems. More particularly, the invention pertains to a system and method for monitoring and confining a subject person or animal within a defined area.

BACKGROUND OF THE INVENTION

Individual monitoring systems and confinement systems have been developed for various applications. One application is the home confinement of early-release prisoners, which is a response by federal, state and local governments and agencies to overcrowded prisons and other social conditions. Another application is the confinement of an animal, such as a canine pet, to a property.

One type of monitoring and restraint system for such applications employs a receiver/transmitter that attaches to a subject, either human or animal, for determining whether the subject has left a confinement area. The confinement area is established by means of a permanent installation of a perimeter wire around the confinement area that is responsive to the receiver/transmitter. As a subject approaches the perimeter, the receiver/transmitter administers a deterrent to prevent the subject from leaving the area. One disadvantage of this system is that the installation of a perimeter wire is labor-intensive and therefore costly. Another disadvantage is that once the wire is installed underground, the confinement area is not easily changed. Relocating the system involves the additional labor and expenses required for the reinstallation of another perimeter wire in a new location.

Another type of system employs a centralized transmitter in combination with a receiver/transmitter. The receiver/transmitter notifies a central station when a subject moves outside the confinement area by transmitting a positional signal. The boundary is established by a relative signal strength level, where the farther the distance from the centralized transmitter, the weaker the signal. The signal strength is equated to the distance of the desired boundary from the transmitter. One disadvantage is that the transmitter may have blackout areas due to obstructions or interference with the signal and the position of the subject may therefore be lost. Another disadvantage is that the boundary configuration is typically limited to the concentric signal strength pattern, thus restricting the shape of the monitored boundary.

SUMMARY OF THE INVENTION

According to an embodiment of the invention, a Global Positioning System ("GPS")-based restraint system includes a GPS receiver/transmitter for receiving GPS timing signals, a mapping algorithm, a comparator, and a base station receiver. The receiver/transmitter includes a microprocessor for calculating and storing a waypoint. The mapping algorithm calculates a mapped programmed confinement area from a plurality of waypoints obtained along the perimeter of the physical confinement area, and the comparator provides an output comparing the present position of the receiver/transmitter with the programmed confinement area. The comparator output is transmitted as an output signal by the receiver/transmitter to the base station receiver and the position of the subject is monitored while the receiver/transmitter is attached to the subject. In another embodiment, deterrent means for administering a deterrent to the subject is substituted for the base station receiver. The deterrent means is attached to the subject and is preferably included in the GPS receiver/transmitter. The comparator output is selectively input to the deterrent means to administer the deterrent to the subject.

In another embodiment of the invention, the restraint system includes the deterrent means, the base station receiver, and also includes a base station transmitter. The comparator output is transmitted as an output signal by the GPS receiver/transmitter to the base station receiver/transmitter which processes the signal and selectively transmits a deterrent signal to the deterrent means to administer the deterrent to the subject. The deterrent means may include electrodes and charging means to charge the electrodes and administer an electric shock to the subject. Other deterrents include offensive noises and vibrations administered to the subject.

Also according to the invention, a method for monitoring the position of a subject relative to a confinement area having a perimeter includes the steps of providing a GPS receiver/transmitter having a microprocessor; providing a mapping algorithm; receiving GPS timing signals with the receiver/transmitter and calculating with the microprocessor a waypoint at each of a plurality of locations along the perimeter; inputting the waypoints into the mapping algorithm to calculate a programmed mapped confinement area; attaching the receiver/transmitter to the subject; and providing a comparator and comparing the present position of the subject with the programmed mapped confinement area to calculate an output indicating the position of the subject relative to the confinement area.

The GPS restraint system of the invention is readily transportable and can be used in a new location or in the same location to cover a new confinement area or a reconfigured existing confinement area. The new or reconfigured confinement area is easily established with appropriate positional fixes taken along the new perimeter.

Reinstallation costs associated with wire perimeter systems are eliminated by the present invention. The GPS-based restraint system is not subject to the blackout areas of other systems, and it provides accurate and reliable confinement boundaries for restraining a subject within the selected confinement area. The system can be readily configured to monitor a plurality of detainees or other subjects.

DESCRIPTION OF THE PREFERRED EMBODIMENT

Figure 1:
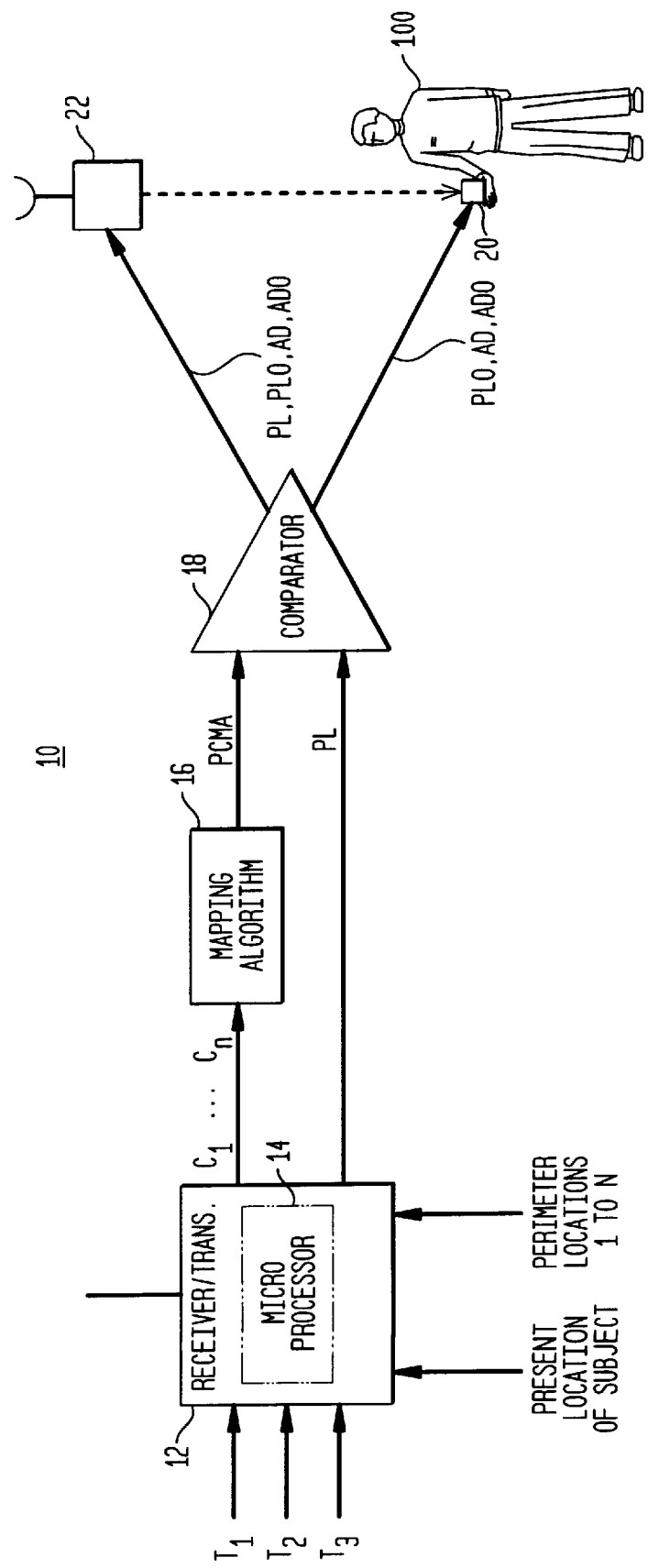
FIG. 1 shows a block diagram of a GPS restraint system according to the invention.

Referring now to FIG. 1, positional monitoring and restraint system 10 includes GPS receiver/transmitter ("R/T") 12 that receives GPS timing signals, preferably at least three timing signals, $T_1$, $T_2$, and $T_3$, respectively transmitted by each of three low earth orbiting satellites that are part of the GPS system. $T_1$, $T_2$, and $T_3$ are each generated by a highly accurate atomic clock on board each satellite and transmitted to earth for reception by earth-based GPS devices such as R/T 12. The present GPS includes 24 satellites uniformly dispersed in six orbits of four satellites each whereby three or more satellites will be visible from most points on the Earth's surface. Each satellite transmits on three frequencies, civilian GPS using an L-band carrier signal ("L1") of 1575.42 MHz. L1 includes a pseudo-random code ("PRN") to identify the satellite, ephemeris data that includes the time data, and almanac data. R/T 12 includes microprocessor 14 for calculating the position of R/T 12 in latitude and longitude by means of triangulation equations and methods using signals $T_1$, $T_2$, and $T_3$ as are well known in the art. The position is stored in microprocessor 14 and is known as a "waypoint". Ground speed and ground track (direction of travel) can also be calculated by continuously updating the position.

R/T 12 is positioned at a desired number of locations 1 to n, and the waypoint ($C_n$) for each position is obtained. R/T 12 preferably includes a function that allows the user to directly input one or more of waypoints $C_1$ to $C_n$ into R/T 12 rather than taking a position fix to obtain a waypoint at each location. R/T 12 also preferably includes functions that allow inputting waypoints as an a smith or as a distance from a known point. Waypoints $C_1$ to $C_n$ are input into mapping algorithm 16, which calculates a programmed map confinement area ("PMCA") that is stored in comparator 18, which is preferably a microprocessor, program or subroutine as is further discussed below.

R/T 12 is attached to subject 100 to monitor the present location ("PL") of subject 100 relative to the PCMA. Comparator 18 determines PL relative to PCMA and generates one or more outputs that, in addition to PL, include whether PL is outside the PCMA ("PLO"), whether PL is within a selected approach distance ("AD") of the PCMA, and/or whether PL has passed a desired approach distance ("ADO") of the PCMA.

Outputs PL, PLO, AD, and/or ADO are transmitted to base receiver station 22, are input into deterrent means 20, which is preferably incorporated into R/T 12 attached to subject 100, or both, depending on the particular configuration of system 10. In one embodiment, microprocessor 14 includes both mapping algorithm 16 and comparator 18. R/T 12 then includes the functions of storing the PMCA, determining PL relative to the PMCA, generating PL and one or more outputs PLO, AD, and ADO, and transmitting the output or outputs to base station 22 or inputting the output to deterrent means 20.

In another embodiment, R/T 12 is just a receiver/transmitter that receives the timing signals, calculates PL, and transmits PL to base station 22 but does not transmit outputs PLO, AD, or ADO. Station 22 preferably includes mapping algorithm 16 and microprocessor 18, and one or more of calculated outputs PLO, AD, and ADO are available to station 22 for monitoring or alarm-actuating or for transmission back to R/T 12, as for example to selectively actuate deterrent means 20.

The accuracy of outputs PL, PLO, AD, and ADO can vary, depending on factors such as Selective Availability ("SA") and atmospheric variations that affect the speed of GPS radio signals. SA is a program that intentionally introduces less accuracy for non-military users of GPS systems. R/T 12 preferably includes differential GPS ("DGPS") means for correcting the SA error, such as an additional receiver coupled to R/T 12 for receiving correction signals from a DGPS beacon station, such as one operated by the U.S. Coast Guard or Army Corps of Engineers that transmits DGPS corrections in the 283.5–325.0 kHz frequency range. The corrections are relayed in a serial data format termed "RTCM SC-104".

Deterrent means 20 may include electrodes positioned on subject 100 and charging means to charge the electrodes and deliver a shock to subject 100 in response to outputs PLO and/or ADO. In one embodiment, R/T 12 is a shock collar that when placed on the neck of an animal such as a canine pet delivers an electrical shock. In another embodiment, deterrent means 20 includes means for producing a noise or vibration.

Figure 2:
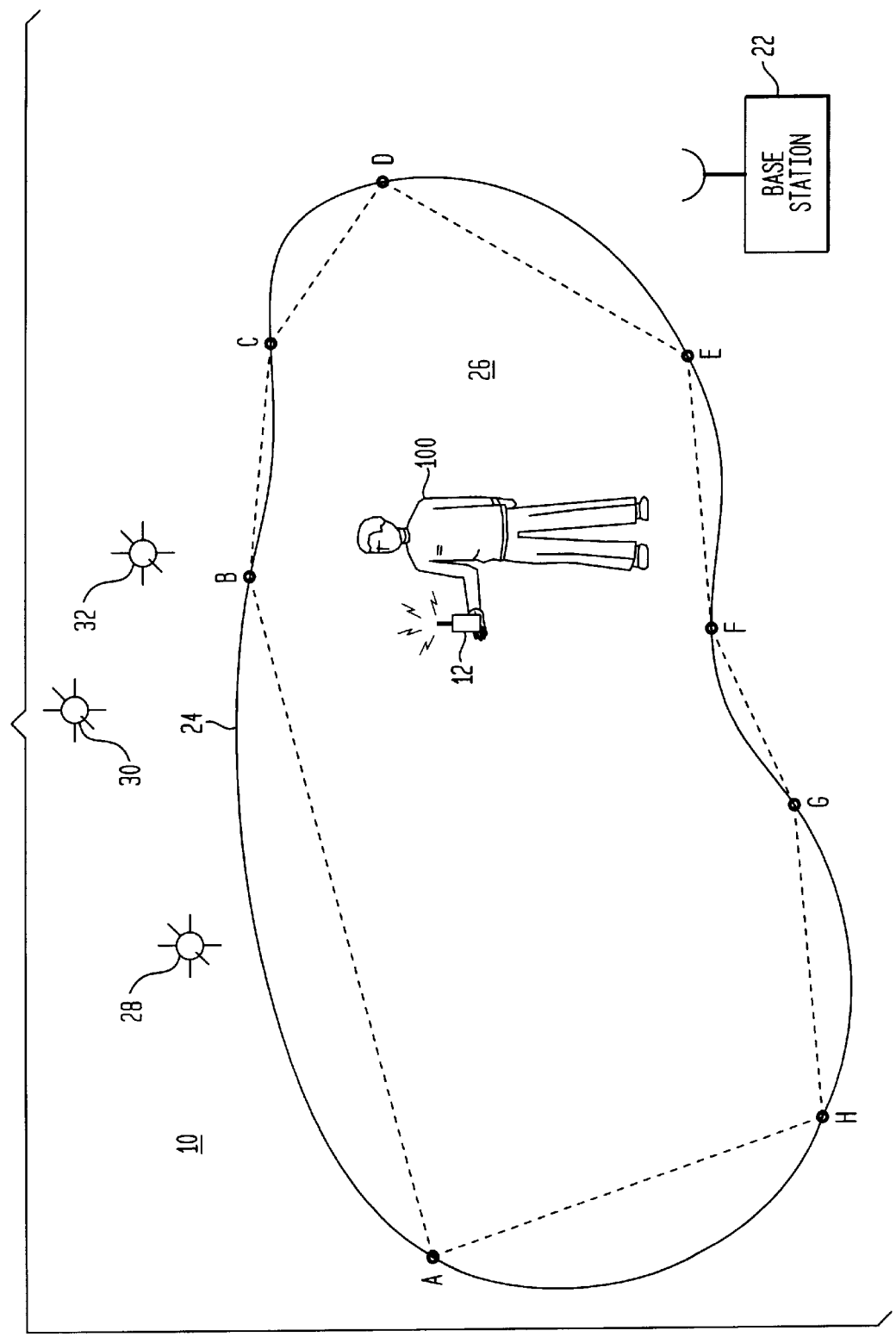
FIG. 2 shows a perspective view of a GPS restraint system according to the invention.

Referring now to FIG. 2, GPS receiver/transmitter R/T 12 is positioned at each of points A through H along perimeter 24 of physical confinement area 26, and at each point a positional fix is taken using timing signals from GPS satellites 28, 30 and 32 as discussed above. The percentage or amount of deviation of outputs PL, PLO, AD, and ADO, which are calculated by comparing PL to the programmed PCMA, from the actual location of R/T 12 and subject 100 relative to physical confinement area 26 will depend on various factors. These factors include the inherent and built-in inaccuracies in the Global Positioning Satellite system, the actual number and location of perimeter locations 1 to n selected by the user, and also the particular mapping algorithm employed. In regard to the latter, mapping algorithm 16 is preferably configured or programmable by the user to establish, set or change the configuration of a PMCA by allowing the user a choice or menu of a number of types of connection paths between adjacent points. As illustrated in FIG. 2, the path between points B and C is or is nearly a straight line, which is a preferable connection path option selectable by the user. Each path between points A-B, C-D, D-E, E-F, G-H, and H-A is an arc curving outward from area 24, and the path between points G-F is an arc curving inward area 24, which are also preferred user-selectable path options. Other connection path options and geometries are also within the scope of the invention.

Positions 1 through n along perimeter 24 are preferably selected to calculate a PCMA closely approximating or identical to physical confinement area 26. The connection path menu aspect eliminates the necessity of walking an entire perimeter in order to obtain waypoints wherever there is a variation in the shape of the perimeter. This allows the user to walk a path such as that illustrated by the dotted line in FIG. 2 rather than the entire perimeter 24 of area 26.

Once the PMCA is established, R/T 12 is attached or secured to subject 100. Subject 100 is an individual, for example a person under house arrest confined to a limited area, or an animal, for example a canine pet. R/T 12 is preferably incorporated into or secured to a collar, a bracelet, or other suitable means for affixing R/T 12 to subject 100. R/T 12 also preferably includes a hasp, a buckle lock, or other means for preventing subject 100 from removing the device. R/T 12 may also include circuitry or other means for detecting the attempted or actual removal of R/T 12 and for transmitting a signal indicating the occurrence to station 22. R/T 12 also preferably includes security or password protection that prevent the subject from accessing or interfering with the PMCA or operation of R/T 12.

Deterrent means 20 may include amplifying means for increasing the strength of the deterrent as subject 100 approaches closer to perimeter 24, and for decreasing the deterrent strength as subject 100 moves further from perimeter 24. R/T 12 may further include award means for providing an award, such as pleasing sounds or a prerecorded voice, as subject 100 moves away from perimeter 24 while inside area 26.

The position of a parolee or an individual confined to house arrest may be monitored using system 10 and law enforcement or other appropriate officials notified when necessary. Station 22 optionally includes an alarm system responsive to outputs PLO or ADO. R/T 12 and/or station 22 may also include means for determining or indicating the direction of travel of subject 100, such as an algorithm or program installed in microprocessor 14 or microprocessor 18 for this purpose, and which may include a vector calculation to indicate both a direction and a speed of travel of subject 100. This output can be input to deterrent means 20 or to the reward means. Station 22 is optionally configured to monitor a plurality of subjects 100 either at one location or at a number of locations.

R/T 12 is portable and is easily transferred to a new location anywhere on the globe where it is within the footprint of orbiting GPS satellites. GPS R/T 12 is then reprogrammable with a new set of position coordinates to establish a confinement area at the new location.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A GPS-based restraint system for monitoring a position of a subject relative to a physical confinement area having a perimeter, comprising:
   (a) a GPS receiver/transmitter for receiving GPS timing signals, said receiver/transmitter including a microprocessor for calculating and storing a waypoint;
   (b) a mapping algorithm for calculating a mapped programmed confinement area from a plurality of waypoints input into the receiver/transmitter;
   (c) a comparator for providing an output comparing a present position of the receiver/transmitter with the programmed confinement area, said output suitable for transmission by the receiver/transmitter; and
   (d) a base station receiver for receiving the output transmitted by the receiver/transmitter,
   wherein the position of the subject is monitored when the receiver/transmitter is attached to the subject.

2. A system as in claim 1, wherein at least some of the waypoints are obtained along the perimeter of the physical confinement area.

3. A system as in claim 1, wherein the microprocessor includes means for calculating the speed and direction of travel of the subject.

4. A system as in claim 1, wherein the subject is a parolee or individual on house arrest.

5. A system as in claim 1, wherein the system is configured to monitor a plurality of subjects.

6. A system as in claim 5, wherein the subjects are parolees or individuals on house arrest.

7. A GPS-based restraint system for restraining a subject within a confinement area having a perimeter, comprising:
   (a) a GPS receiver/transmitter for receiving GPS timing signals, said receiver/transmitter including a microprocessor for calculating and storing a waypoint;
   (b) a mapping algorithm for calculating a mapped programmed confinement area from a plurality of waypoints input into the receiver/transmitter;
   (c) a comparator for providing an output comparing a present position of the receiver/transmitter with the programmed confinement area, said output suitable for transmission by the receiver/transmitter; and
   (d) deterrent means responsive to said output for administering a deterrent to the subject.

8. A system as in claim 7, wherein at least some of the waypoints are obtained along the perimeter of the physical confinement area.

9. A system as in claim 8, wherein the deterrent means includes means for increasing the strength of the deterrent as the subject approaches the perimeter and for decreasing the strength of the deterrent as the subject moves away from the perimeter while inside the confinement area.

10. A system as in claim 7, wherein the subject is a canine.

11. A system as in claim 10, wherein the receiver/transmitter is part of a collar to be worn by the canine.

12. A system as in claim 7, wherein the deterrent means comprises electrodes and charging means for charging the electrodes.

13. A GPS-based restraint system for restraining a subject within a physical confinement area having a perimeter, comprising:
    (a) first receiving and transmitting means for receiving GPS timing signals, said first receiving and transmitting means including processing means for calculating and storing a waypoint;
    (b) mapping means for calculating a programmed mapped confinement area from a plurality of waypoints input into the first receiving and transmitting means;
    (c) comparing means for providing an output comparing the present position of the first receiving and transmitting means with the programmed mapped confinement area, said output suitable for transmission by the first receiving and transmitting means; and
    (d) second receiving means for receiving the output transmitted by the receiver/transmitter,
    wherein the position of the subject is monitored when the first receiving and transmitting means is attached to the subject.

14. A system as in claim 13, wherein at least some of the waypoints are obtained along the perimeter of the physical confinement area.

15. A system as in claim 13, wherein the processing means includes means for indicating the direction of travel of the subject.

16. A system as in claim 13, wherein the subject is a parolee or individual on house arrest.

17. A system as in claim 13, wherein the system is configured to monitor a plurality of subjects.

18. A system as in claim 13, wherein the first receiving and transmitting means further includes a differential GPS receiver for receiving a correction signal transmitted by a beacon station.

19. A method for monitoring the position of a subject relative to a confinement area having a perimeter, comprising the steps of:
    (a) providing a GPS receiver/transmitter having a microprocessor;
    (b) providing a mapping algorithm;
    (c) receiving GPS timing signals with the receiver/transmitter and calculating with the microprocessor a waypoint at each of a plurality of locations along the perimeter;
    (d) inputting the waypoints into the mapping algorithm to calculate a programmed mapped confinement area;
    (e) attaching the receiver/transmitter to the subject; and
    (f) providing a comparator and comparing the present position of the subject with the programmed mapped confinement area to calculate an output indicating the position of the subject relative to the confinement area.

20. A method as in claim 19, wherein the output is transmitted to a base station receiver.

21. A method as in claim 19, wherein the output is input to a means for administering a deterrent.

22. A method as in claim 19, further including the step of actuating an alarm when the output indicates the subject is within a selected approach distance of the perimeter.

23. A method as in claim 19, further including the step of actuating an alarm when the output indicates the subject is outside the confinement area.

24. A method as in claim 19, further comprising the steps of reprogramming the receiver/transmitter by repeating steps (b) through (f) for the desired confinement area.

25. A method as in claim 19, further including the steps of:

a) computing the speed and direction of travel of the subject with the microprocessor; and b) providing a signal to the base station receiver indicating the speed and direction of travel of the subject.

26. A method as in claim 19, wherein the subject is a parolee or individual on house arrest.

27. A method as in claim 19, further comprising the step of monitoring the location of a number of subjects.

* * * * *